United States Patent [19]

Nakamura

[11] Patent Number: 4,508,080
[45] Date of Patent: Apr. 2, 1985

[54] INJECTION QUANTITY CORRECTING DEVICE FOR DISTRIBUTION TYPE FUEL INJECTION PUMP

[75] Inventor: Hisashi Nakamura, Higashi-Matsuyama, Japan

[73] Assignee: Diesel Kiki Co., Ltd., Tokyo, Japan

[21] Appl. No.: 531,641

[22] Filed: Sep. 13, 1983

[30] Foreign Application Priority Data

Sep. 24, 1982 [JP] Japan ............................. 57-167124

[51] Int. Cl.³ ........................................... F02M 39/00
[52] U.S. Cl. ................................... 123/449; 123/383; 123/373
[58] Field of Search ............... 123/449, 382, 383, 385, 123/386, 387, 373

[56] References Cited

U.S. PATENT DOCUMENTS

| | | | |
|---|---|---|---|
| 4,187,818 | 2/1980 | Phillips | 123/382 |
| 4,308,834 | 5/1982 | Eheim | 123/383 |
| 4,384,560 | 5/1983 | Jäger | 123/383 |
| 4,445,476 | 5/1984 | Eheim | 123/387 |
| 4,450,805 | 5/1984 | Eheim | 123/383 |

Primary Examiner—Charles J. Myhre
Assistant Examiner—Carl Stuart Miller
Attorney, Agent, or Firm—Wenderoth, Lind & Ponack

[57] ABSTRACT

A distribution type fuel injection pump in which a control sleeve is provided for changing a time of opening a cut off port which is shiftable on a plunger reciprocating synchronously with rotation, and an injection quantity is controlled by adjusting a position of the control sleeve by a tension lever that receives an operation of a governor spring and a centrifugal force governing member, the improved pump in which a piston connected to a lever for determining a maximum shifting position of the tension lever is disposed in a sliding hole, and this piston is energized by a return spring, and the return spring side of this piston is made to be a low pressure chamber and an opposite return spring side is made to be a high pressure chamber. A servo valve is provided in the piston and this servo valve is displaced so as to balance the fuel pressure in the pump chamber and the pressing force of the servo spring and the fuel pressure in the high pressure chamber is controlled. As a result, the piston is caused to move by following the servo valve, and the lever for determining the maximum shifting position of the tension lever is moved and a correction of the full load injection quantity against the rpm of the engine is carried out. The setting force of the servo spring that energizes the servo valve is changed by the pressure applied to a pressure responding member, and a shifting characteristics of the piston by the servo valve is changed so that a correction of a full load injection quantity by the atmospheric pressure and the boost pressure is simultaneously carried out.

6 Claims, 4 Drawing Figures

INJECTION QUANTITY CORRECTING DEVICE FOR DISTRIBUTION TYPE FUEL INJECTION PUMP

BACKGROUND OF THE INVENTION

1. Field of the Invention

In a distribution type fuel injection pump for an internal combustion engine, this invention relates to a device for automatically correcting a full load injection quantity by not only rpm of the engine but also the boost pressure and atmospheric pressure.

2. Description of the Prior Art

In the distribution type fuel injection pump, particularly the pump for direct-injection engine, the injection quantity characteristic is in the tendency of dropping in a high rotation zone relative to the pump speed by a throttling action of the nozzle. As a countermeasure, a negative angleichung device is incorporated, but there is a drawback that the correction cannot be made from the stroke-wise limitation, and for the correcting performance improvement, the full load injection quantity correcting device illustrated in FIG. 1 has been developed.

This device is constructed in such way that the maximum shifting position of the tension lever is changed by the pressure (the pressure and pump rpm are proportional) in the pump chamber (3) to prevent the dropping in the high rotation zone.

In a brief description of the distribution type fuel injection pump, a plunger (5) for distribution doubling as pump is slidably fitted in a sliding hole (1a), and this plunger (5) is caused to reciprocate and rotate by a means not illustrated in the drawing.

In case the plunger (5) is in a suction stroke which is a movement of left direction in the drawing, the fuel of the pump chamber (3) supplied from feeding pump (not shown) is sucked into a pump chamber (14) through one of suction grooves (13) whose number corresponds to the number of cylinders of the engine which are disposed equally on the outer periphery of the head portion of the plunger (5) by means of a supply path (11).

When the plunger (5) is shifted in feeding stroke which is a movement of right direction in the drawing, the supply path (11) and the suction groove (13) are separated, and the fuel in the pump chamber (14) is compressed and is supplied to one of distribution paths (17) from a distribution port (16) by means of a through hole (15) perforated in the plunger (5) in its axial direction and is sent to an injection nozzle not shown from a feeding valve (18), and is injected into the cylinder.

The full load injection quantity correcting device is constructed in such way that a piston (80) is provided to receive the pressure in the pump chamber (3), and the control characteristic is memorized as an inclined surface (80a) in this piston (80), and a sensor pin (81) abuts on the inclined surface (80a), and as the pressure in the pump chamber (3) is increased, and the piston (80) is shifted, the sensor pin (81) is placed according to this movement, and a lever (41) for determining the maximum shifting position of the tension lever is moved and the maximum shifting position of the tension lever (24) is changed.

However, when the full load injection quantity correcting device of this kind is provided, an atmospheric pressure correcting device and boost pressure correcting device are not provided, and there is a problem that the correction of the atmospheric pressure and the boost pressure cannot be made which is the drawback.

SUMMARY OF THE INVENTION

A first object of this invention is to perform a correction of the atmospheric pressure and boost pressure simultaneously in addition to the full load injection quantity control against rpm of the engine.

A second object of this invention is to obtain positively a control signal of the atmospheric pressure or the boost pressure to be obtained from the sensor pin even if it is a relatively small mechanical position signal.

A third object of this invention is to enlarge a control power for moving the lever for determining the maximum shifting position of the tension lever.

BRIEF DESCRIPTION OF THE DRAWINGS

These objects will be achieved by this invention, and its concrete embodiments will be described by referring to the attached drawings and the following detailed description of the invention. By the way, the changes or modifications related to the detailed portions of the structure will be included in the scope of the claims to be described hereinafter.

DETAILED DESCRIPTION OF THE INVENTION

The embodiments of this invention will be described in the following.

Figure 1:
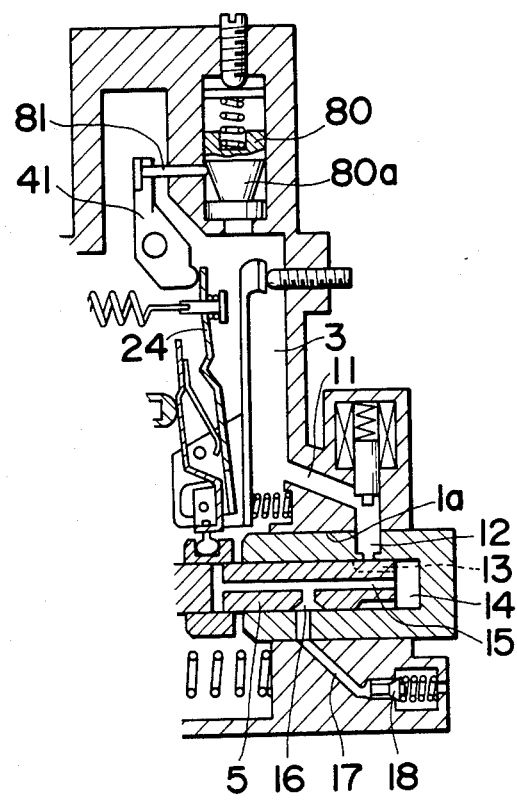
FIG. 1 is a cross sectional view of the conventional full load injection quantity correcting device against rpm of the engine.
Figure 2:
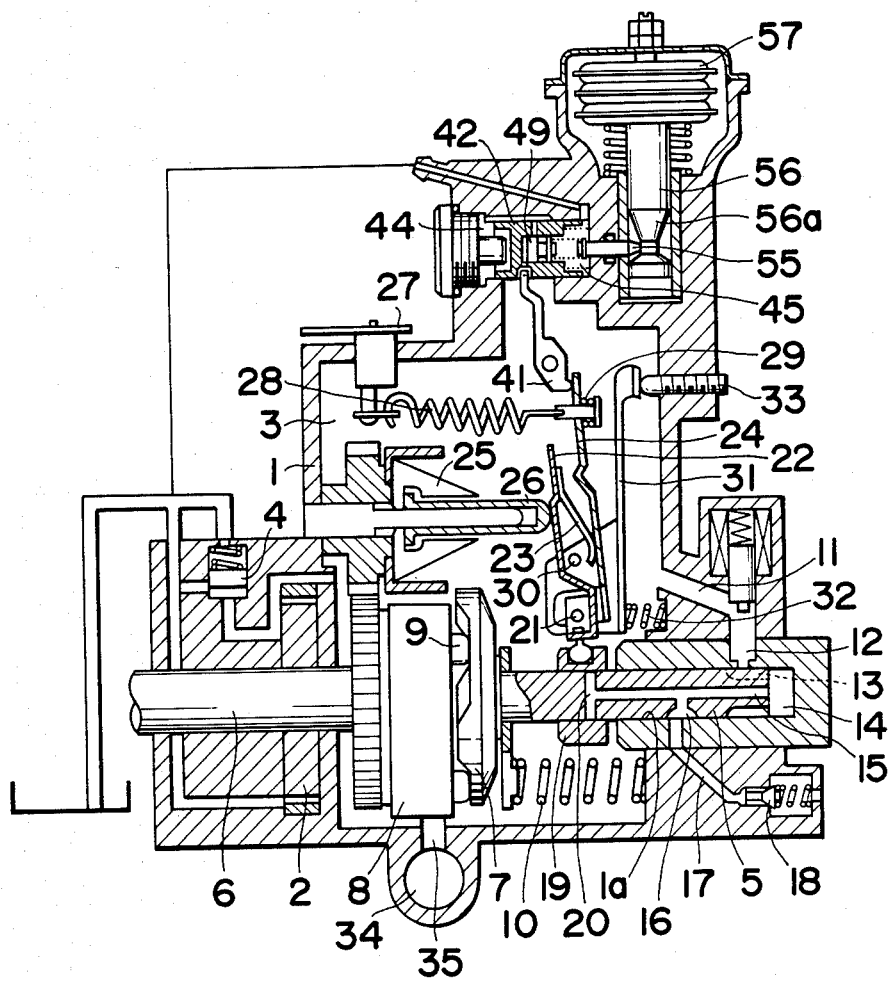
FIG. 2 is a cross sectional view of an embodiment of this invention.
Figure 3:
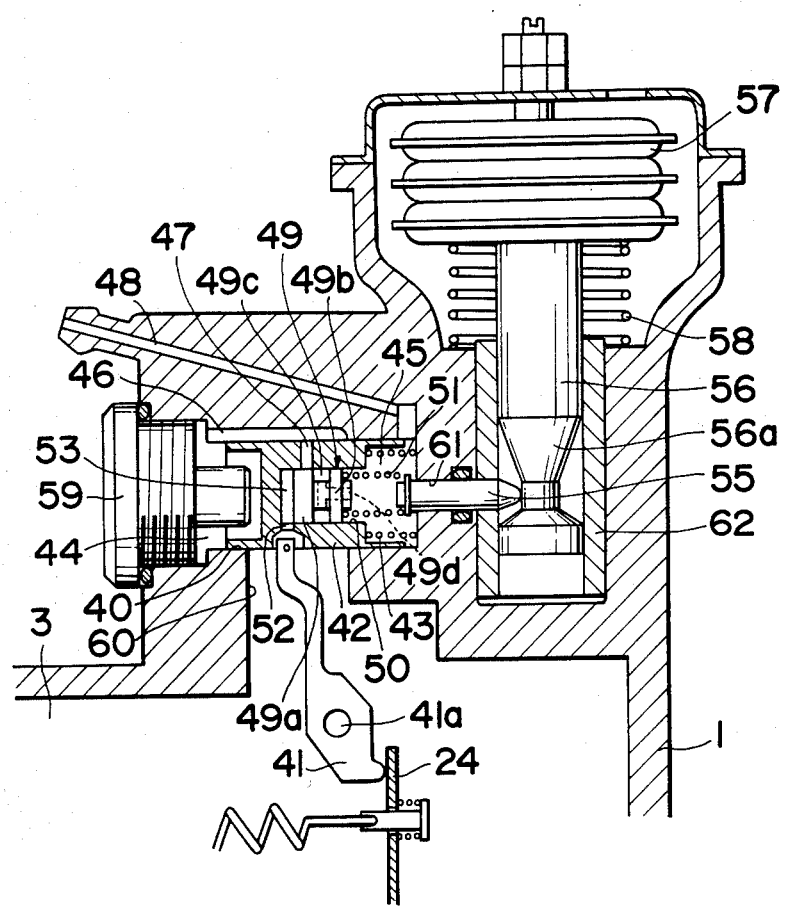
FIG. 3 is a cross sectional view of an enlarged essential portion of the embodiment.

In FIGS. 2 and 3, the distribution type fuel injection pump is illustrated which is capable of performing the full load injection quantity correction by the rpm of the engine and the atmospheric pressure.

In the distribution type fuel injection pump, the fuel is supplied to the pump chamber (3) in the pump housing (1) by means of a fuel feeding pump (2) driven by the engine. The internal pressure of the pump chamber (3) is controlled by the pressure control valve (4) related to the rpm of the engine as well known so that as the rpm is increased, the internal pressure is increased proportionally.

In the sliding hole (1a) provided in the pump housing (1), the plunger (5) is slidably installed, and this plunger (5) is rotated simultaneously with the reciprocating motion by a means to be described hereinafter.

Namely, the drive shaft (6) and the cam disc (7) fixed to the base portion of the plunger (5) are connected in a rotation direction by means of the driving disc, and the cam surface of the cam disc (7) having the cam surface whose number corresponds to the number of cylinders of the engine is urged against the roller (9) retained on the roller holder (8) by means of the plunger spring (10) thereby performing the reciprocating motion for suction pressure feeding of the fuel to the plunger (5) and the rotation for distribution simultaneously.

In case the plunger (5) is in the suction stroke which is a movement in left direction in the drawing, the fuel in the pump chamber (3) is supplied to the plunger chamber (14) from the suction port (12) through the supply path (11) by means of one of a plurality of suction grooves (13) formed on the outer periphery of the head portion of the plunger (5) in its axial direction.

When the plunger (5) is shifted in the pressure feeding stroke, the suction port (12) and the suction groove (13) are separated, and the fuel in the plunger chamber (14) is compressed, and is supplied to one of the distribution paths (17) (cylinders are provided in the circumferential direction) from the distribution port (16) through the vertical hole (15) in the plunger (5), and is sent to the injection nozzle not shown from the feeding valve (18) and is injected into the cylinder.

Also, in the portion of the plunger (5) projecting to the side of the pump chamber (3), the control sleeve (19) is slidably fitted, and when the cut off port (20) communicated with the vertical hole (15) of the plunger (5) opens to the pump chamber (3) as the port (20) is offset from the upper edge of the control sleeve (19), the fuel flows out to the pump chamber (3) so that the feeding of the fuel to the feeding valve (18) is stopped and the injection completes. Accordingly, the completion of injection is changed by the adjustment of the position of the control sleeve (19), namely, the injection quantity can be controlled, and, for example, when the control sleeve (19) is shifted to the left direction in the drawing, the injection quantity is decreased.

The control sleeve (19) is engaged with one end portion of the start lever (22) whose middle portion is pivotally supported on the supporting shaft (21), and the lever (22) is displaced in the direction of the opposite tension lever (24) centering around the supporting shaft (21) as a fulcrum by the elastic force of the start spring (23), and its other end is engaged with the sleeve (26) of the centrifugal governor (25) at the side of the opposite tension lever.

The tension lever (24) is caused to operate with the governor spring (28) and the idle spring (29) whose spring force is adjusted by the speed lever (27) interlocking with the accelerator in the direction opposite to the operating direction of the centrifugal governor (25).

In the foregoing construction, the position of the tension lever (24) is controlled by the balance of the operating force of the centrifugal governor (25) and the operating force of the governor spring (28), and the position of the control sleeve (19) is adjusted by means of the start lever (22).

Also, the supporting shaft (21) of the start lever (22) and the tension lever (24) is retained on the lower end portion of the collector lever (31) pivotally supported on the immovable stationary shaft (30) so as to be rotatable, and the collector lever (31) is energized by the spring (32) by the lower end portion in clockwise direction in the drawing, and the upper end portion abuts on the tip of the adjusting lever (33) (full load set screw). Accordingly, the posture of the collector lever (31) is changed by adjusting the position of the adjusting lever in its axial direction to change the position of the supporting shaft (21), and the full load injection quantity can be optionally set.

The roller holder (8) is rotatably provided concentrically with the plunger (5), and is engaged with the piston (not shown) of the injection timing device (34) to be described hereinafter by means of the lever (35).

The injection timing device (34) determines the position in the circumferential direction of the roller holder (8) by means of the lever (35) according to the position of the piston in relation with the fuel pressure in the pump chamber (3). The contact position of the roller (9) and the cam surface of the cam disc (7) is changed by the change of the position in the circumferential direction of the roller holder (8), and the phase in the circumferential direction of the drive shaft (6) produces the relative change with the operating position of the plunger (5) according to the contact position, and the injection time can be changed against the rotation of the drive shaft.

As the construction related to this invention, the sliding hole (40) is formed on the upper part of the pump housing (1) in horizontal direction from the outside, and the plug (59) is screwed to the opening portion of the outside. This sliding hole (40) is communicated with the pump chamber (3) by means of the hole (60) formed on the housing (1) at its lower side.

The piston (42) is housed in the sliding hole (40), and the part of the lower portion of the piston (42) is exposed to the pump chamber (3) by means of the hole (60). This piston (42) is connected to the lever (41) for determining the maximum shifting quantity of the tension lever by means of the hole (60), and is rotated by the movement of the piston (60) centering around the shaft (41a) as the fulcrum.

The piston (42) is energized in the left direction of the return spring (43) disposed at its right side, and the high pressure chamber (44) is formed at the opposite return spring side of the piston, and the low pressure chamber (45) is formed at the return spring side.

The piston (42) is formed with the sliding hole (50) of the servo valve that opens to the low pressure chamber (45) in the center of the axial direction, and through holes (47) and (52) are formed in diametral direction which are communicated with the servo valve sliding hole (50), and the through hole (52) is provided in the deepest portion of the sliding hole (50) of the servo valve.

The high pressure chamber (44) of the left side of the piston (42) is communicated with the servo valve sliding hole (50) by means of the path (46) and the through hole (47) formed on the pump housing (1). Also, the low pressure chamber (45) of the left side of the piston (42) is communicated with the suction side of the fuel feeding pump (2) by means of the path (48) through the pipe not shown.

The servo valve (49) comprises two lands (49a) and (49b), the annular groove (49c) provided between the lands, and the through hole (49d) communicating the annular groove (49c) with the low pressure chamber (45), and is disposed slidably in the servo valve sliding hole (50) formed on the piston (42), and is provided in the low pressure chamber (45) and is energized in the left direction by the servo spring (51) for abutment against one end of the sensor pin to be described hereinafter. The fuel in the pump chamber (3) is introduced to the opposite servo spring side chamber (53) of the servo valve (49) by means of the through hole (52), and the servo valve (49) is displaced by the fuel to the position at which the balance with the servo spring (51) is obtained.

Accordingly, the land (49a) opens/closes the through hole (47) in communication with the high pressure chamber (44) by the position of the servo valve (49), and the high pressure chamber (44) is communicated with the pump chamber (3) or the low pressure chamber (45), and the pressure in the high pressure chamber (44) is controlled, and the piston (42) is shiftably controlled in the direction where the through hole (47) is closed. Namely, the lever (41) for determining the maximum shifting position of the tension lever by the displacement of the piston (42) is caused to move centering around the shaft (41a) as the fulcrum.

The other end of the servo spring (51) that energizes the servo piston (42) is such that the setting force of the servo spring (51) is changed by the displacement of the sensor pin (55). The sensor pin (55) is slidably provided in the hole (61) formed on the pump housing (1) in horizontal direction, and its tip is in contact with the lower end of the inclined surface (56a) having memorized the control characteristic, and when the control rod (56) formed with the inclined surface (56a) is displaced, the sensor pin (55) moves in right and left direction accordingly.

The control rod (56) is disposed slidably in the guide cylinder (62) provided in the pump housing (1) in vertical direction, and the inclined surface (56a) is provided at its lower end and the pressure responding member (57), for example, bellows is provided at its upper end. Accordingly, the control rod (56) is displaced by the contraction and expansion of the pressure responding member (57) (namely, it is caused by the fluctuation of the atmospheric pressure due to the shifting between the low and high portions), and for example, in case of the shifting from the low portion to the high portion, the pressure responding member (57) extends and the control rod (56) shifts in downward direction by resisting the return spring (58) so that the tip of the sensor pin (55) reaches the inclined surface (56a) and the sensor pin (55) moves in left direction and the setting force of the servo spring (51) can be changed. By the way, in the drawing, the position of the piston (42) is in the balanced condition with the spring (43) as the fuel pressure controlled by the servo valve (49) is introduced to the high pressure chamber (44).

In the foregoing construction, when the engine is rotated, the plunger (5) is caused to make simultaneously the reciprocation motion for pressure feeding of suction of the fuel and the fuel is sent to the respective injection nozzles. The pressure in the pump chamber (3) is increased in proportion to the rpm of the engine, but the pressure of the pump chamber (3) is introduced to the side chamber (53) of the opposite servo spring by means of the through hole (52), and applies the pressure by resisting the servo valve (49) and the servo spring (43), and the servo valve (49) is caused to displace. For this displacement, the through hole (47) opens to the side chamber (53) of the opposite servo spring, and the fuel in the pump chamber (3) flows into the high pressure chamber (44), and applies the pressure in the right direction to the piston (42) by resisting the return spring (43), and the piston (42) is caused to shift to the position where the through hole (47) is closed by the land (49a) of the servo valve (49) and is stopped. Accordingly, the lever (41) for determining the maximum position of the tension lever connected to the piston (42) is moved according to the shifting of the piston (42), and the full load injection quantity correction against the rpm of the engine is carried out.

When the fluctuation of the atmospheric pressure, namely, shifting from the low region to the high region is taken place, the pressure responding member (57) extends, and the control rod (56) is displaced in downward direction. As a result, the sensor pin (55) is moved in left direction by the displacement thereof, and the setting force of the servo spring (51) is changed. Namely, the servo piston (49) at the balanced position is moved in left direction by the change (in this embodiment, the increment of the setting force) of the setting force of the servo spring, and the through hole (47) opens, and the fuel in the high pressure chamber (44) is released, and the piston (42) is shifted to the position where the through hole (47) is closed and is stopped. Accordingly, the lever (41) for determining the maximum shifting position of the tension lever from the displacement of the piston (42) to the full load injection quantity correction against the rpm of the engine is moved, and in addition, the full load injection quantity correction by the atmospheric pressure can be simultaneously carried out.

Figure 4:
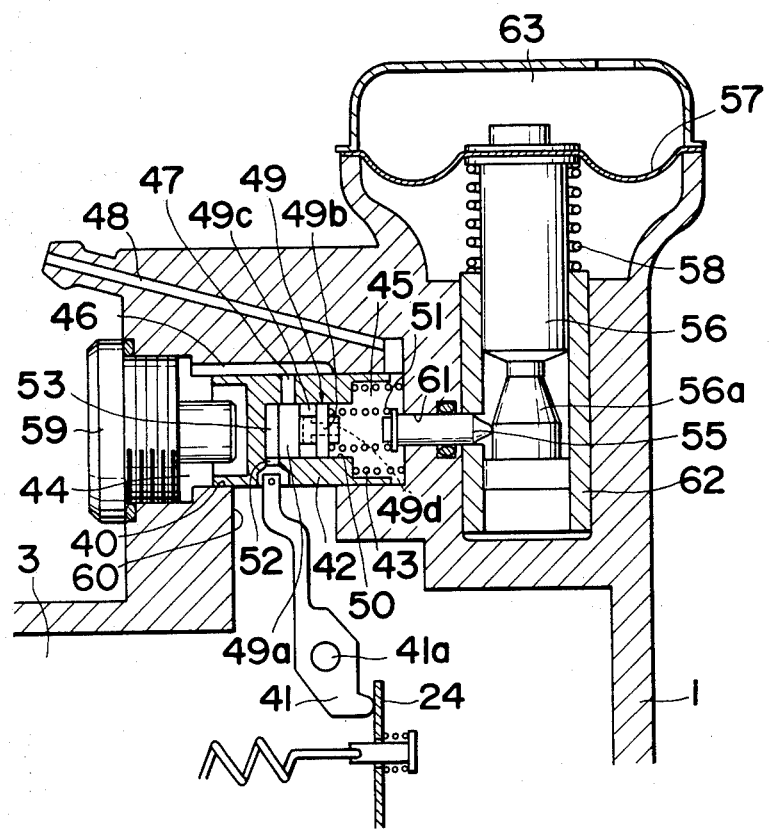
FIG. 4 is a cross sectional view of an enlarged essential portion showing another embodiment of this invention.

In FIG. 4, another embodiment of this invention is illustrated and this embodiment is different from the foregoing embodiment in that the diaphragm is provided by replacing the pressure responding member (57) with the bellows, and the inclined surface (56a) having memorized the control characteristic which is formed on the control rod (56) becomes inverse to the direction of inclination in the foregoing embodiment. By this arrangement, the correction of the fuel by the boost pressure can be carried out. By the way, with respect to others, this embodiment is identical with the foregoing embodiment and identical symbols are attached to identical parts thereby omitting the description thereof.

In the foregoing construction, in the engine equipped with the supercharger the boost pressure is applied to the boost supply chamber (63), and the control rod (56) is displaced by resisting or following the return spring (58) in proportion to the boost pressure. For this displacement, the tip of the sensor pin (55) is shifted to a proper location on the inclined surface (56a), and the sensor pin (55) is moved in right and left directions, and the setting force of the servo spring (51) is changed. Accordingly, the servo valve (49) is moved and the pressure in the high pressure chamber (44) is controlled and the full load injection quantity is controlled in porportion to the boost pressure and the full load injection quantity correction can be carried out by the boost pressure.

What is claimed is:

1. In a distribution type fuel injection pump comprising a plunger that reciprocates and rotates simultaneously, a control sleeve adapted to shift on the plunger and changes the time of opening a cut off port, and a tension lever for adjusting the position of the control sleeve by receiving the action of a servo spring and a centrifugal governor; an injection quantity correcting device for the distribution type fuel injection pump comprising a piston connected to a lever for determining the maximum shifting position of the tension lever and being housed in a sliding hole and having a high pressure chamber and a low pressure chamber at its both ends, a return spring for energizing this piston in the direction of the high pressure chamber, a servo valve provided in the piston and controls the pressure in the high pressure chamber by the pressing force of a servo spring and the pressure in the opposed pump chamber, and a pressure responding member for changing the setting force of the servo spring that applies the pressure to the servo valve.

2. A distribution type fuel injection pump according to the claim 1 in which the piston is provided with a servo valve sliding hole formed to open to the low pressure chamber, a through hole communicated with the servo valve sliding hole and communicated with the pump chamber at its deepest portion, and a through hole communicated with the high pressure chamber in the middle.

3. A distribution type fuel injection pump according to the claim 1 in which the servo valve is disposed in the servo valve sliding hole formed on the piston, and is provided with two lands, an annular groove between both the lands, and a through hole communicating the annular groove and the low pressure chamber.

4. A distribution type fuel injection pump according to the claim 1 in which the control power from the pressure responding member is determined by the inclined surface formed on the control rod and the sensor pin abutting on the inclined surface.

5. A distribution type fuel injection pump according to the claim 1 in which the pressure responding member is made of a bellows.

6. A distribution type fuel injection pump according to the claim 1 in which the pressure responding member is made of a diaphragm.

* * * * *